US007101528B2

(12) United States Patent
Martin et al.

(10) Patent No.: US 7,101,528 B2
(45) Date of Patent: Sep. 5, 2006

(54) HIGH PH DISPERSIBLE NANO-ALUMINAS

(75) Inventors: Thomas J. Martin, Tulsa County, OK (US); Dave S. Pope, Calcasieu Parish, LA (US)

(73) Assignee: Sasol North America Inc., Houston, TX (US)

( * ) Notice: Subject to any disclaimer, the term of this patent is extended or adjusted under 35 U.S.C. 154(b) by 260 days.

(21) Appl. No.: 10/832,147

(22) Filed: Apr. 26, 2004

(65) Prior Publication Data
US 2005/0238572 A1    Oct. 27, 2005

(51) Int. Cl.
C01F 7/02    (2006.01)

(52) U.S. Cl. .................. 423/625; 423/626; 423/111; 977/773; 977/811

(58) Field of Classification Search .............. 423/625, 423/626, 111; 977/773, 811
See application file for complete search history.

(56) References Cited

U.S. PATENT DOCUMENTS

| | | | |
|---|---|---|---|
| 4,836,948 A | 6/1989 | Corring | |
| 4,913,840 A | 4/1990 | Evans et al. | |
| 5,273,949 A | 12/1993 | Chopin et al. | |
| 5,705,222 A | 1/1998 | Somasundaran et al. | |
| 5,746,819 A | 5/1998 | Kostelnik et al. | |
| 5,856,265 A | 1/1999 | Kanazirev | |
| 5,989,515 A | 11/1999 | Watanabe et al. | |
| 6,027,706 A | 2/2000 | Pinnavaia et al. | |
| 6,432,531 B1 | 8/2002 | Sippel et al. | |
| 6,440,187 B1 | 8/2002 | Kasai et al. | |
| 6,569,920 B1 | 5/2003 | Wen et al. | |

FOREIGN PATENT DOCUMENTS

JP          11-21135 A  *  1/1999

OTHER PUBLICATIONS

Alumina Nanofibers Prepared from Aluminum Hydrate with Poly-(ethylene oxide) Surfactant, H.Y. Zhu, J.D. Riches, and J.C. Barry, Chem. Mater. 2002, 14, 2086-2093.

Interaction Between a-Alumina Surface and Polyacrylic Acid, Yoshihiro Hirata, et al., Journal of the Ceramic Society of Japan, Int. Edition, vol. 100-8, p. 7-12, 1992.

Aggregation and Dispersion of Colloidal Suspensions by Inorganic Surfactants: Effect of Chemical Speciation and Molecular Conformation, Jun Liu et al., J. Phys. Chem. B 1997, 101, 8264-8259.

Isoelectric Points of Metal Oxides at High Ionic Strengths, Marek Kosmulski, et al., J. Phys. Chem. B 2002, 106, 2918-2921.

Dispersion and Consolidation of Alumina Using a Bis-Hydrophilic Diblock Copolymer, Lisa M. Palmqvist et al., J. Am. Ceram. Soc. 83 [7] 1585-91 (2000).

Poly(acrylic acid)-Poly(ethylene oxide) Comb Polymer Effects on BaTiO 3 Nanoparticle Suspension Stability, Glen H. Kirby et al., J. Am. Ceram. Soc., 87 [2] 181-86 (2004).

Influence of pH and Ionic Impurities on the Adsorption of Poly(acrylic) Dispersant onto a Zinc Oxide Surface, Andrej Degen et al., J. Am. Ceram. Soc., 86[12]2001-10 (2003).

Electrosteric Stabilization of Al2O3, ZrO2, and 3Y-ZrO2 Suspensions: Effect of Dissociation and Type of Polyelectrolyte, Journal of Colloid and Interface Science 228, 73-81 (2000).

Huntsman, Technical Bulletin, The Jeffamine Polyoxyalkyleneamines, pp. 1-6, 2002.

Metastability and Multistability: Gelation and Liquid Crystal Formation in Suspensions of Colloidal Rods, M.P.B. van Bruggen and H.N.W. Lekkerkerker, Langmuir 2002, 18, 7141-7145.

* cited by examiner

Primary Examiner—Stanley S. Silverman
Assistant Examiner—Timothy C. Vanoy
(74) Attorney, Agent, or Firm—C. James Bushman; Browning Bushman P.C.

(57) ABSTRACT

A process for producing nano sized boehmite aluminas which are stable at alkaline pH values wherein an aqueous medium of a peptized boehmite alumina is treated with a water dispersible polycarboxylic acid polymer and optionally with an organic water dispersible base having a molecular weight ranging from 500 to 3000 and having no more than three basic groupings to produce a treated boehmite alumina which forms a stable sol at a pH of greater than 6, the treated boehmite alumina having a dispersed particle size of less than 500 nm in the sol.

17 Claims, 2 Drawing Sheets

HIGH PH DISPERSIBLE NANO-ALUMINAS

BACKGROUND OF THE INVENTION

The present invention relates to a process for producing nano-scale aluminas that are dispersible in aqueous mediums at a pH greater than 6.

DESCRIPTION OF THE PRIOR ART

Alumina sols comprising colloidial dispersions of alumina hydrate particles in water are well known. These sols may be in the form of an aluminum monohydrate such as boehmite or pseudoboehmite and can be prepared by various methods including hydrolysis of organic aluminum compounds, bubbling carbon dioxide through a solution of sodium aluminate and autoclaving an aqueous slurry containing boehmite. In all these known methods, the alumina dispersion produced is stabilized by the presence of an acid, giving a pH value of the dispersion which is typically about 4–5, otherwise the solid alumina constituent will precipitate out of the dispersion or form a gel. These boehmite alumina sols are cationic in the sense that the particles of alumina carry positive electric charges. The sol ceases to be stable if the acid is neutralized such that when the pH value increases to about 6 or beyond, or if the sol is mixed with an anionic sol in which the dispersed particles carry negative charges.

Alumina sols wherein the pH is 7 or greater have great utility in applications where the properties of the boehmite aluminas are required, e.g., hardness, shape, porosity, size, surface reactivity, etc., but alkaline aqueous dispersions are required.

U.S. Pat. No. 4,913,840 discloses a process for producing a stable alkaline sol of an anionic colloidial alumina hydrate by calcining alumina hydrate to form coarse particles of crystalline alumina monohydrate and then reducing the average size of the coarse particles to less than one micron in all dimensions by attrition milling the coarse particles with a dispersion liquid to produce a colloidial dispersion of the particles in the liquid.

SUMMARY OF THE INVENTION

In a preferred embodiment, the present invention provides a process for producing a boehmite alumina which forms a stable sol at a pH greater than 6 comprising providing an aqueous medium of a peptized boehmite alumina and treating the peptized alumina with a water dispersible polycarboxylic acid polymer to produce a treated boehmite alumina which forms a stable sol at a pH greater than 6, the treated boehmite alumina having a dispersed particle size of less than 500 nm in said sol.

In another preferred embodiment of the present invention, the aqueous medium of the peptized boehmite alumina is treated with a water dispersible polycarboxylic acid polymer to produce a treated boehmite alumina, and a water dispersible organic base having a molecular weight of from 500 to 3,000, the organic base having no more than three basic groupings, the organic base being present in an amount that at least partially, but not totally, neutralizes the polycarboxylic acid.

DESCRIPTION OF THE ILLUSTRATED EMBODIMENTS

Figure 1:
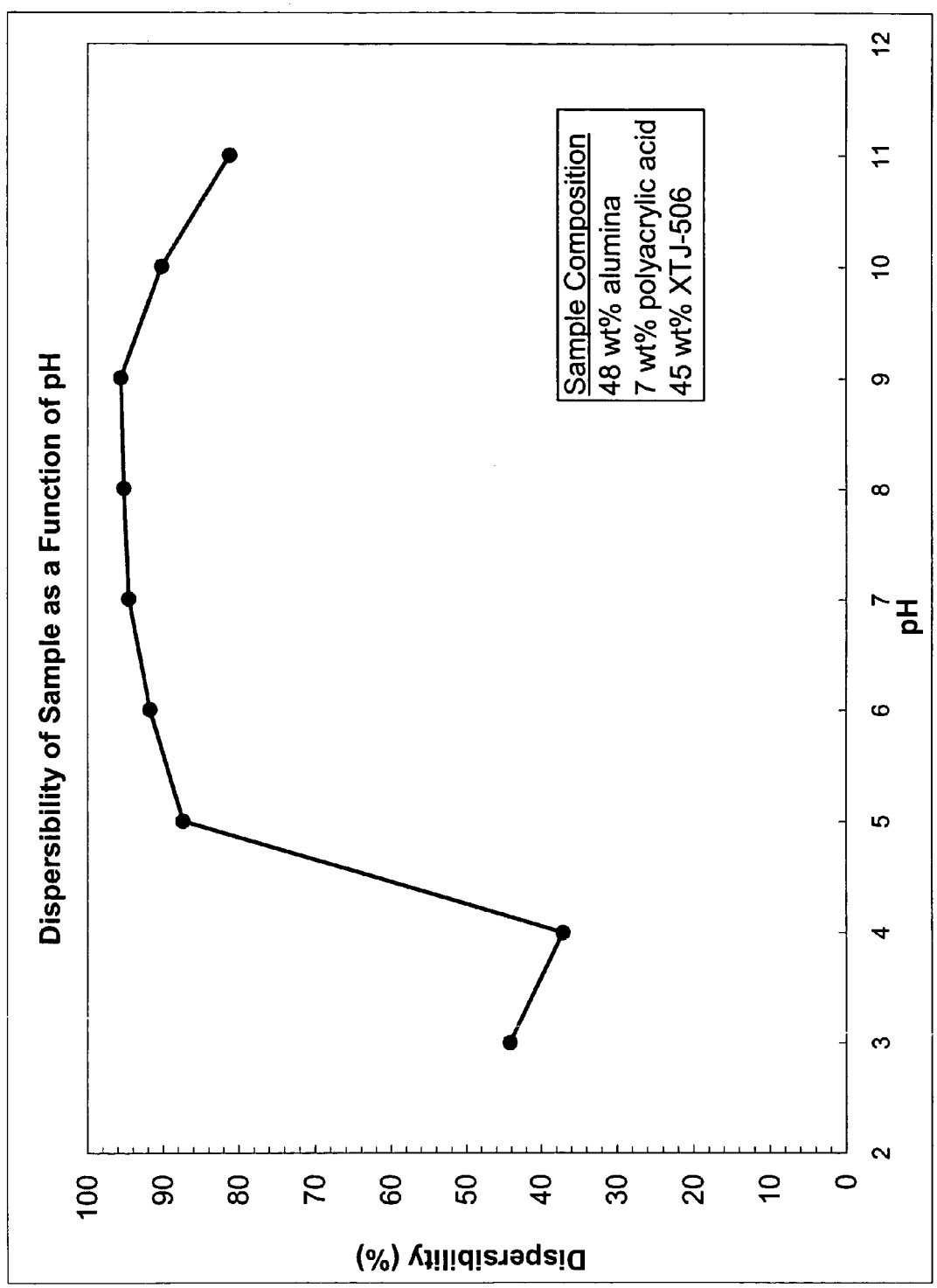
FIG. 1 is a graph showing the effect of pH on the dispersibility of a treated boehmite alumina according to the present invention.

The term "treated aluminas" as used herein is intended to mean an alumina which has been treated according to the process of the present invention. The aluminas suitable for use in the present invention are those hydrated aluminas which can be obtained from a variety of sources. In particular, the present invention is directed towards monohydrate aluminas, e.g., boehmite and pseudo boehmite. More particularly, the aluminas used in the present invention are boehmites and 1 or more pseudoboehmites obtained from the alkali or neutral hydrolysis of aluminum alkoxides, a process which is well known to those skilled in the art. The hydrolysis products of aluminum alkoxides are typically large alumina agglomerates held together by the hydrogen bonding at the alumina crystallite surfaces. As used herein, the term alumina is intended to include hydrated aluminas and in particular monohydrate aluminas, especially boehmite and pseudoboehmite aluminas.

In conducting the process of the present invention, a peptized alumina is used as the starting material. Peptizing, i.e., the process of dispersing a solid to form a colloid as sol, is well known in the art and is typically conducted in the case of aluminas of the type under consideration by treatment of the alumina with an acid such as nitric acid, hydrochloric acid, formic acid, acetic acid, etc. However, it is within the scope of the present invention that the acid used to peptize the alumina can be the polycarboxylic acid polymer used in the process.

The polycarboxylic acid polymers employed in the process of the present invention are water dispersible polymers of alpha-beta monoolefinically unsaturated lower aliphatic carboxylic acids (3 to 6 carbon atoms) having a molecular weight of from about 500 to about 20,000 preferably from about 500 to about 10,000. The term "water dispersible" as used herein means that the material is water soluble or at least forms a stable sol/colloidial suspension. Non-limiting examples of such polycarboxylic acids include polyacrylic acid (PAA); polymethacrylic acid; block copolymers of vinylcarboxylic acids such as PMMA-b-PEO available from Th. Goldschmidt AG, Essen, Germany; comb polymers with vinylcarboxylic acid backbones and PEO teeth such as the PAA-PEO products available from W. R. Grace; copolymers containing the above polymers; and partial salts of the above copolymers.

The organic bases employed in the process of the present invention will generally have a molecular weight of from 500 to about 3,000, and will preferably have no more than three basic groupings, more preferably only one basic grouping. Non-limiting examples of suitable bases include polyoxyalkylene amines wherein one or more primary amino groups is attached to the terminus of a polyether backbone. Thus these compounds can properly be characterized as polyether amines, the polyether backbone being based either on propylene oxide (PO), ethylene oxide (EO), or mixed EO/PO. In particular the monoamines of such compounds have been found to be particularly useful in the process of the present invention. Especially preferred polyether amines useful in the present invention have the structure:

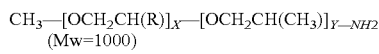
(Mw=1000)

wherein R is H or $CH_2$, x and y are integers reflecting the respected EO and PO blocks of the polymer and the PO/EO ratio is 9/1 to 29/6, and especially preferred ratio of PO/EO being 3/19. These polyether amines are available from Huntsman Corporation and are sold under the trademark Jeffamine®. As noted, especially preferred are the monoamines since it has been found that the diamines and triamines of such polyether amines do not result in stable sols at lower, albeit alkaline pH values. As used herein, the term "stable sol" is one in which the colloidial material, e.g., the boehmite alumina, remains in the dispersed state of storage over an extended period of time. Accordingly, the organic bases useful in the present invention are those which are "bulky" enough to produce steric stabilization but yet have a limited number of basic groupings which react with the carboxylic acid groupings on the polycarboxylic acid polymers.

In conducting the process of the present invention, the peptized alumina can be treated with the polycarboxylic acid polymer alone or alternatively, and in a more preferred embodiment, with the polycarboxylic acid polymer in admixture with the organic base. In the latter case, it is possible to either react the peptized boehmite alumina with the polycarboxylic acid polymer followed by reaction with the organic base, or the peptized boehmite alumina can be reacted with a premix of a polycarboxylic acid polymer and the organic base, it being remembered that the base will always be present in a ratio or amount that partially, but not totally, neutralizes the polycarboxylic acid polymer. Generally speaking, the ratio of polycarboxylic acid polymer functional groups to organic base functional groups will be from 2:1 to 1:1, depending on the type of base employed. It will be appreciated that the amount of the polycarboxylic acid polymer and/or the organic base added to the alumina will depend upon the degree of surface treatment desired. In other words, depending upon the surface area of the alumina and the desired degree of coverage or interaction with the surface, more or less of the polycarboxylic acid polymer and the organic base may be employed. It will also be appreciated that one of skill in the art can readily determine from the surface area of the alumina what amount of acid and/or organic base is desired to provide an end product (treated boehmite) having the desired properties.

Generally speaking the amount of organic base employed, when it is used, will be such as to raise the pH of the treated boehmite alumina to above 6, i.e., the amount of base added could clearly be sufficient to raise the pH to 8 or even higher values.

As noted, when the organic base is employed in the process of the present invention, it can either be added together with the polycarboxylic acid, i.e., the aqueous dispersion of the peptized boehmite alumina can be added to a mixture of the polycarboxylic acid and the organic base, or alternatively, the peptized alumina can first be treated with the polycarboxylic acid alone and the organic base subsequently added.

The process of the present invention can be conducted at a temperature of from about 10 to about 100° C. preferably below about 50° C. and is generally conducted with moderate agitation for a period of time ranging from about 10 minutes to 24 hours preferably less than about 2 hours. Once the boehmite alumina has been treated, either with the polycarboxylic acid alone or with a combination of the polycarboxylic acid and the organic base, it can be recovered as a dry powder by techniques well known in the art such as by spray drying, e.g., at a temperature of 220° C. inlet and 100° C. outlet.

By using the process of the present invention, nanoparticles of boehmite alumina can be obtained and stable colloidial sols in alkaline pH ranges can be formed. The nano-particles of boehmite alumina that can be produced according to the present invention can range from less than 500, preferably less than 300, down to about 100 nm or smaller. It has also been found that the polycarboxylic acid treated boehmite aluminas of the present invention exhibit these nano-particle sizes over a wide alkaline pH range, e.g., from about 7 to about 11 and even higher. As noted, the polycarboxylic acid treated boehmite alumina, optionally treated with an organic base, can be recovered as a dried powder and it has been found that the powder is free flowing. This powder has a dispersibility (1 to 5 wt./wt. %) in alkaline aqueous mediums, e.g., pH 7 to 11 of greater than 75%, preferably greater than 90%.

To more fully illustrate the present invention, the following non-limiting examples are presented. In all cases dispersibility was determined on the basis of a 5 wt./wt. % basis while particle size measurements were conducted on an approximate 0.1 wt./wt. % basis.

EXAMPLE 1

87.9g of a boehmite crystallite phase alumina (DISPAL 30F4 marketed by Sasol North America, Inc.) which had been peptized with formic acid was dispersed in 1471g deionized (DI) water. An 11.9g quantity of PAA having a $MW_w$ of approximately 2,000 g/mol marketed by Aldrich Chemical Co. was dissolved in 200g DI water with 82.5g of an amine-terminated PEO polymer (Jeffamine® XTJ-506 marketed by Huntsman Corporation) at ambient temperature. The alumina sol was slowly added to the polymer solution with moderate agitation and allowed to mix for 30 minutes. The reaction product containing the treated aluminas, which had thickened somewhat, was spray dried at 220° C. inlet and 100° C. outlet temperatures. The dry, free flowing, white powder recovered from the spray drying procedure was then redispersed in DI water. The dispersion had a pH of 8.2 and was a stable sol with an average particle size of 124 nm.

EXAMPLE 2

The procedure of Example 1 was followed with the exception that DISPAL® alumina 23A4 was used in place of DISPAL alumina 30F4. The resulting, dry powder, when dispersed gave a stable sol, the pH being 7.7, the average particle size of the dispersed alumina being 157 nm. It was also determined that the alumina had a zeta potential of −31mV indicating a negative surface charge. Typically, boehmite alumina at this high of a pH has a positive surface charge. The pH of the treated alumina sol was then adjusted upward by the addition of ammonium hydroxide. At a pH of 8.7, the average particle size of the alumina was 160 nm and at a pH of 10.1, the average particle size of the boehmite alumina was 107 nm.

EXAMPLE 3

Experiments were conducted to determine the dispersibility of treated boehmites in accordance with the process of the present invention as a function of pH. A sample of oven-dried, treated alumina was prepared in substantially the same manner as described with respect to Example 1, the ratio of PAA functional groups to organic base function groups being 2:1. The composition of the sample is shown on FIG. 1 where the alumina is DISPAL 30F4. Dispersions of the treated alumina in DI water adjusted to various pH values using potassium hydroxide were prepared. The results are shown in FIG. 1.

EXAMPLE 4

This example demonstrates the dispersibility of the treated alumina as a function of PAA loading. Samples of treated alumina using only PAA and no base were prepared. The alumina employed was Dispal® 30F4. The treated alumina was basically prepared by the procedure of Example 1. The relative PAA loading and dispersibility is shown in Table 1 below and graphically demonstrated in FIG. 2.

TABLE 1

Dispersibility as a function of PAA loading

| wt frac PAA | Dispersibility @ pH = 10 | Dispersibility @ pH = 8 | Dispersibility @ pH = 6 |
|---|---|---|---|
| 0.00 | 10 | | |
| 0.08 | 57 | | |
| 0.14 | 78 | 40 | |
| 0.25 | 92 | 45 | 33 |
| 0.40 | 95 | 70 | 33 |
| 0.50 | 99 | 89 | 49 |

Figure 2:
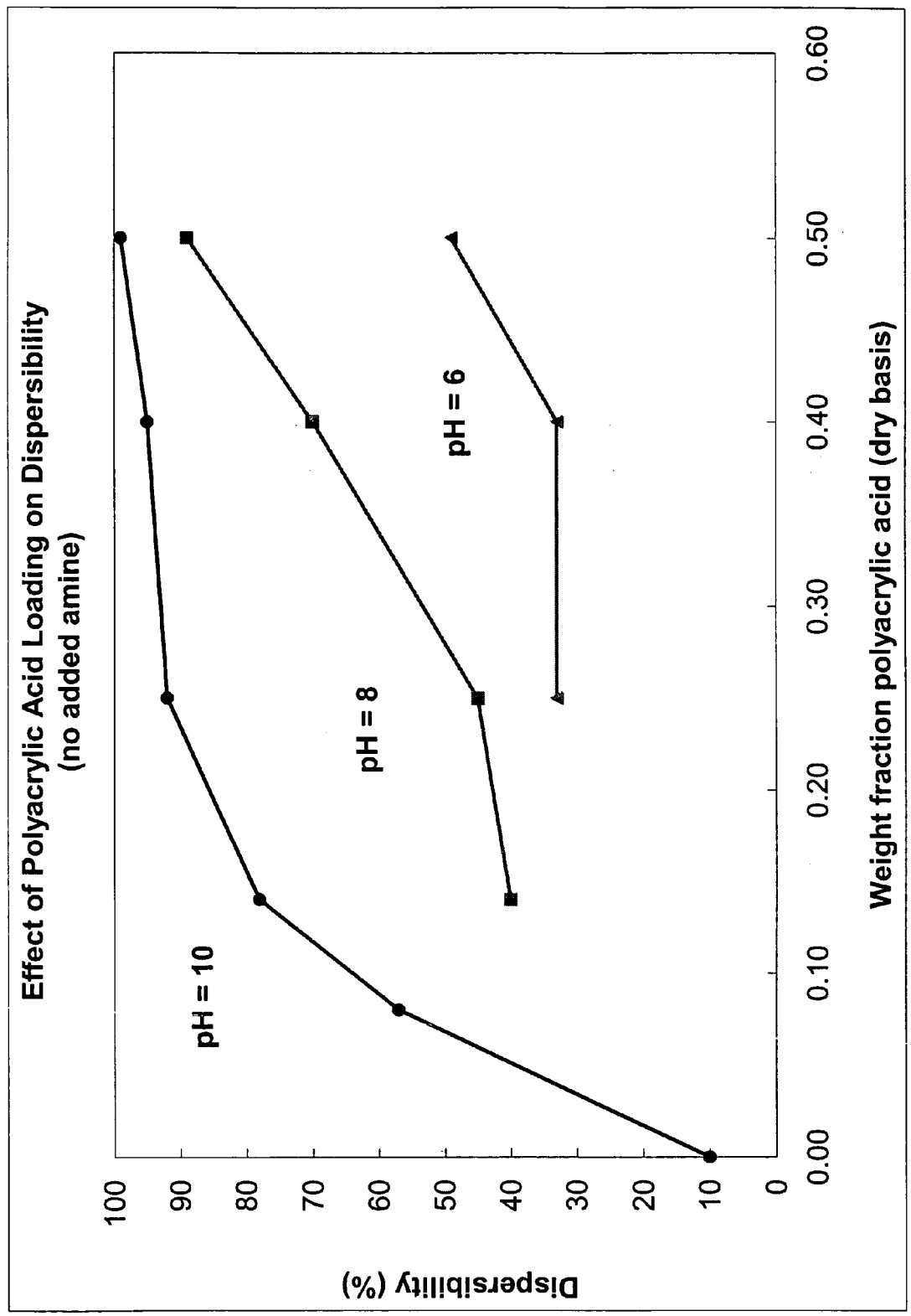
FIG. 2 is a graph showing the effect of polyacrylic acid loading on the dispersibility of treated boehmite alumina prepared according to the process of the present invention.

As can be seen from the data in Table 1 and FIG. 2 boehmite alumina treated only with PAA shows excellent dispersibility at a pH of 10, particularly when the weight fraction of PAA exceeds about 0.1. At lower pH values, e.g., pH 8, a higher wt. fraction of PAA is necessary to achieve acceptable dispersibility.

EXAMPLE 5

A series of various aluminas were treated as per the procedure of Example 1 with polyacrylic acid and XTJ-506 using a mol ratio of PAA to XTJ-506 of 2:1. Table 2 shows the results of particle size measurements and the pH of the dispersed samples.

TABLE 2

| | Alumina | Acid 1 | Amine | pH of 5% redispersed powder | part.size of redispersed powder |
|---|---|---|---|---|---|
| V1222-68B | C200$_1$ | PAA | XTJ-506 | 6.94 | 224.7 nm |
| V1222-68C | Dispal ® 23A4-80$_2$ | PAA | XTJ-506 | 8.19 | 126.5 nm |
| V1222-69A | Dispal ® 30F4$_3$ | PAA | XTJ-506 | 7.99 | 99.5 nm |
| V1222-69B | Dispal ® 18N4$_4$ | PAA | XTJ-506 | 5.93 | 169.6 nm |
| V1222-69C | Dispal ® 14N4$_5$ | PAA | XTJ-506 | 6.08 | 226.8 nm |

$_1$Marketed by Sasol North America, Inc., particle size, 150 nm
$_2$Marketed by Sasol North America, Inc., particle size, 82 nm
$_3$Marketed by Sasol North America, Inc., particle size, 60–70 nm
$_4$Marketed by Sasol North America, Inc., particle size, 110 nm
$_5$Marketed by Sasol North America, Inc., particle size, 120 nm

EXAMPLE 6

The procedure of Example 1 was followed using a ratio of PAA functional groups to base functional groups of 2:1 and in certain cases employing different bases. As can be seen from the data in Table 3, the pH of produced sols was less than 6. The pH of the samples was adjusted to a value of approximately 8 with potassium hydroxide. The samples were dried and then redispersed in DI water. Upon redispersion, all of the samples settled out with the exception of the sample that had been prepared using XTJ-506 as the base. The data in Table 3 also demonstrates that inorganic bases such as potassium hydroxide or organic bases of low molecular weight are basically ineffective in forming a treated boehmite product which is dispersible at an alkaline pH.

TABLE 3

| | Alumina | Acid | Base | pH of sol | adjusted pH w/ 45% KOH | pH of 5% redispersed powder | part.size of redispersed powder |
|---|---|---|---|---|---|---|---|
| V1222-70A | Dispal®[1] 30F4 | PAA | XTJ-506 | 5.15 | 8.17 | 9.04 | 138.9 nm |
| V1222-70B | Dispal® 30F4 | PAA | Ethanol Amine | 5.15 | 8.07 | 6.99 | settles out |
| V1222-70C | Dispal® 30F4 | PAA | KOH | 5.54 | 8.1 | 8.13 | settles out |
| V1222-70D | Dispal® 30F4 | PAA | Di-isopropyl Amine | 4.01 | 8.13 | 8.23 | settles out |

[1]Particle size 60–70 nm

EXAMPLE 7

This example demonstrates the use of various bases. The procedure of Example 1 was followed, the ratio of PAA functional groups to base functional groups being 1:1. Samples of the treated aluminas were dispersed in deionized water and the pH adjusted with ammonium hydroxide.

Particle size measurements and dispersibility of the samples are shown in Table 4.

As can be seen from the data in Table 4, a polyether monoamine is superior in terms of producing treated boehmites having high dispersibility. However, as can also be seen even in the case of polyether triamines, at high pH values (10.2) the treated aluminas exhibit decent dispersibility albeit that the particle sizes are somewhat larger than desired.

TABLE 4

| Sample | Additive | Structure | pH | Particle size, nm | pH | Particle size, nm | pH | Particle size, nm | Dispersibility (% at pH = 10) |
|---|---|---|---|---|---|---|---|---|---|
| 89B | XTJ-506[1] | $CH_3-[OCH_2CH(R)]_X-[OCH_2CH(CH_3)]_Y-NH_2$ (Mw = 1000) | 7.7 | 140 | 8.6 | 131 | 10.5 | 111 | 99 |
| 92A | D-2000[1] | $NH_2CH(CH_3)CH_2-[OCH_2CH(CH_3)]X-NH_2$ (Mw = 2000) | 5.9 | settles | 8.2 | settles | 10.2 | 416 | 94 |
| 92B | XTJ-501[1] | $NH_2CH(CH_3)CH_2[OCH_2CH(CH_3)CH_2]_X-[OCH_2CH_2]_Y-[(OCH_2CH(CH_3)]_Z-NH_2$ (Mw = 900) | 4.9 | settles | 8.2 | settles | 10.1 | 237 | 90 |
| 93B | XTJ-502[1] | $NH_2CH(CH_3)CH_2[OCH_2CH(CH_3)CH_2]_X-[OCH_2CH_2]_Y-[OCH_2CH(CH_3)]_Z-NH_2$ (Mw = 2000) | 5.8 | settles | 8.5 | settles | 10.6 | 173 | 88 |
| 93C | XTJ-505[1] | $CH_3-[OCH_2CH(R)]_X-[OCH_2CH(CH_3)]_Y-NH_2$ (MW = 600) | 7.4 | 157 | 8.6 | 103 | 10.3 | 121 | 73 |
| 93A | XTJ-509[1] | $CH_2-[OCH_2CH(CH_3)]_X-NH_2$ / $CH_2-[OCH_2CH(CH_3)]_Y-NH_2$ / $CH_2-[OCH_2CH(CH_3)]_Z-NH_2$ (Mw = 3000) | 8.0 | settles | 8.4 | settles | 10.2 | 637 | 67 |
| 90A | D-400[1] | $NH_2CH(CH_3)CH_2-[OCH_2CH(CH_3)]_X-NH_2$ (MW = 400) | 6.6 | settles | 8.2 | settles | 10.3 | 537 | 23 |
| 92C | T-403[1] | $CH_2[OCH_2CH(CH_3)]_XNH_2$ / $CH_3CH_2CCH_2[OCH_2CH(CH_3)]_YNH_2$ / $CH_2[OCH_2CH(CH_3)]_ZNH_2$ (Mw = 440) | 7.0 | settles | 8.4 | settles | 10.2 | settles | 22 |

[1]Marketed by Huntsman

EXAMPLE 8

The procedure of Example 7 was followed with the exception that other bases (additives) were employed. The data is shown in Table 5. As can be seen from Table 5 while certain other low molecular weight organic bases function to a certain degree in terms of producing relatively decent dispersibility and desired particle size at very high pH values, i.e., about 10 and greater, for the most part the dispersibilities are generally commercially unacceptable and furthermore high alkalinity, i.e., pH greater than about 10, is required to achieve even that relative degree of dispersibility.

Representative but non-limiting applications for the compositions obtained by this process includes catalysts and catalyst supports; coatings; adsorbents; surface treatments; ceramics and refractories; reinforcement of ceramics, metals, plastics and elastomers; scratch resistant coatings; agents for the delivery of pharmaceutically active materials; thickening agents and rheology modifiers; rinse aids; fabric treatment; paper treatment; inkjet recording media; soil resistant coatings; and barrier coatings.

Modifications of the compositions, procedures and conditions disclosed herein that will still embody the concept of the improvements described should readily suggest themselves to those skilled in the art, and are intended to be encompassed within the spirit of the invention presently disclosed herein as well as the scope of the appended claims.

TABLE 5

| Sample | Additive | pH | Particle size, nm | pH | Particle size, nm | pH | Particle size, nm | Dispersibility (% at pH = 10) |
|---|---|---|---|---|---|---|---|---|
| 97C | Benzylamine | 4.7 | settles | 8.5 | settles | 10.2 | 184 | 56 |
| 98A | Ethanolamine | 5.9 | 376 | 8.7 | 363 | 10.4 | 203 | 46 |
| 97A | aniline | 3.8 | settles | 8.8 | settles | 10.3 | 255 | 38 |
| 100A | piperazine | 6.3 | 298 | 8.4 | 189 | 10.5 | 159 | 23 |
| 99A | imidazole | 5.4 | settles | 8.6 | 301 | 10.5 | 194 | 22 |
| 101A | quinoline | 3.6 | 1745 | 8.3 | 584 | 10.4 | 237 | 21 |
| 100B | pyridine | 3.3 | 360 | 8.4 | 264 | 10.5 | 182 | 19 |
| 96A | Acetamide | 3.7 | Settles | 8.1 | Settles | 10.5 | 187 | 16 |
| 97B | benzimidazole | 5.4 | settles | 8.8 | 313 | 10.3 | 159 | 11 |

EXAMPLE 9

A series of samples of treated alumina were prepare using various amount of PAA in XTJ-506. The alumina employed was Dispal 23A4. The PAA in organic base were dissolved in 30g BI water which were then added to the boehmite alumina sol which contained 10g of the boehmite alumina and 75g of DI water. After following stirring for 30 minutes, the samples were spray dried and redispersed at 5 wt./wt.% and DI and pH measured (pH1) and the particle size measured. The pH was then adjusted with ammonium hydroxide and the particle size again measured. The results are shown in Table 6 including the weight fraction of alumina, PAA and XTJ-506.

What is claimed is:

1. A process for producing an alumina which forms a stable sol at a pH of greater than 6 comprising:
   providing an aqueous medium of a peptized boehmite alumina; and
   treating said peptized alumina with a water dispersible polycarboxylic acid polymer to produce a treated boehmite alumina which forms a stable sol at a pH of greater than 6, said treated boehmite alumina having a dispersed particle size of less than 500 nm in said sol.

TABLE 6

| Sample | DISPAL 23A4 (weight fraction) | Polyacrylic acid (weight fraction) | XTJ-506 (weight fraction) | pH 1 | Particle size 1 (nm) | pH 2 | Particle size 2 (nm) | pH 3 | Particle size 3 (nm) |
|---|---|---|---|---|---|---|---|---|---|
| 41A | 0.741 | 0.027 | 0.232 | 8.05 | settles | 8.05 | settles | 9.85 | settles |
| 47B | 0.726 | 0.047 | 0.227 | 6.26 | 167 | 8.64 | 137 | 10.07 | 115 |
| 50A | 0.712 | 0.065 | 0.223 | 6.29 | 253 | 8.79 | 146 | 10.05 | 128 |
| 41F | 0.614 | 0.051 | 0.335 | 7.74 | 157 | 8.73 | 116 | 10.08 | 107 |
| 49A | 0.592 | 0.085 | 0.323 | 5.18 | 220 | 8.49 | 132 | 10.08 | 116 |
| 50B | 0.571 | 0.117 | 0.312 | 4.58 | 190 | 8.36 | 130 | 10.23 | 117 |
| 42A | 0.524 | 0.067 | 0.409 | 7.24 | 121 | 8.23 | 118 | 10.13 | 107 |
| 49B | 0.499 | 0.111 | 0.389 | 5.18 | 171 | 8.23 | 138 | 10.05 | 124 |
| 50C | 0.477 | 0.152 | 0.372 | 4.65 | 171 | 8.26 | — | 10.03 | 133 |

As can be seen from the data in Table 6, there is a threshold amount of the PAA an organic base necessary to achieve a stable sol at alkaline conditions. Additionally, the data in Table 6 shows that with increasing pH, the particle size decreases.

2. The process of claim 1 wherein said alumina is produced by hydrolysis of an aluminum alkoxide.

3. The process of claim 1 wherein said polycarboxylic acid polymer is a polymer of an alpha/beta monoolefinically unsaturated lower olefinic carboxylic acid having from 3 to 6 carbon atoms.

4. The process of claim 3 wherein said polycarboxylic acid polymer is polyacrylic acid.

5. The process of claim 1 wherein said treated boehmite alumina has a dispersed particle size of less than 300 nm.

6. The process of claim 1 wherein said boehmite alumina is peptized using said polycarboxylic acid polymer.

7. The process of claim 1 comprising recovering said treated boehmite alumina as a dry powder.

8. A process for producing an alumina which forms a stable sol at a pH of greater than 6 comprising:
   providing an aqueous medium of a peptized boehmite alumina;
   treating said peptized alumina with a water dispersible polycarboxylic acid polymer to produce a polycarboxylic acid modified boehmite alumina; and
   treating the polycarboxylic acid modified boehmite alumina with an organic, water dispersible base having a molecular weight ranging from 500 to 3,000, said base having no more than three basic groupings, to produce a treated boehmite alumina which forms a stable sol at a pH of greater than 6, said treated boehmite alumina having a dispersed particle size of less than 500 nm in said sol.

9. The process of claim 8 wherein said alumina is produced by hydrolysis of an aluminum alkoxide.

10. The process of claim 8 wherein said polycarboxylic acid polymer is a polymer of an alpha/beta monoolefinically unsaturated lower olefinic carboxylic acid having from 3 to 6 carbon atoms.

11. The process of claim 10 wherein said polycarboxylic acid polymer is polyacrylic acid.

12. The process of claim 8 wherein said treated boehmite alumina has a dispersed particle size of less than 300 nm.

13. The process of claim 8 wherein said boehmite alumina is peptized using said polycarboxylic acid polymer.

14. The process of claim 8 comprising recovering said treated boehmite alumina as a dry powder.

15. The process of claim 8 wherein said organic base comprises a polyether amine.

16. The process of claim 15 wherein said polyether amine is a monoamine.

17. The process of claim 8 wherein the mol ratio of polycarboxylic acid to organic base is from 2:1 to 1:1.

* * * * *